I. Davis,

Pipe Coupling,

Nº 79,055. Patented June 23, 1868.

Fig 2,

Witnesses,
H. C. Ashkittle
Theo Fushe.

Inventor,
I. Davis
per Munn & Co
attorneys

United States Patent Office.

ISAAC DAVIS, OF BROOKLYN, NEW YORK.

Letters Patent No. 79,055, dated June 23, 1868.

IMPROVEMENT IN CONNECTIONS FOR SOFT-METAL PIPES.

*The Schedule referred to in these Letters Patent and making part of the same.*

TO ALL WHOM IT MAY CONCERN:

Be it known that I, ISAAC DAVIS, of Brooklyn, in the county of Kings, and State of New York, have invented a new and useful Improvement in Connecting Lead Pipes; and I do hereby declare that the following is a full, clear, and exact description thereof, which will enable others skilled in the art to make and use the same, reference being had to the accompanying drawings, forming a part of this specification, in which—

Figure 2 is a plan view of the same.

Similar letters of reference indicate corresponding parts.

This invention relates to a new method of connecting the ends of lead pipes without soldering, so that they can be easily secured together, and easily taken apart. Heretofore, lead pipes could only be connected with each other by soldering, which is not only a tedious and annoying process, but which is also imperfect, as it prevents the pipe from being easily taken to pieces, if desired.

The object of my invention is to provide a device, by means of which the ends of two pieces of lead pipe can be instantaneously connected without loss of time, and without the use of solder.

The invention consists in the use of two screw-caps, which are fitted around the two ends of pipe to be connected, the ends of the pipe being then flattened out, so that flanges are formed around the ends. A washer being interposed between the two ends of pipe, the two caps are screwed together until the washer is firmly clamped between the flanges on the pipes. The pipe-ends are then firmly connected, a water-tight joint being produced, and still no solder nor any other binding-material is used. Whenever desired, the pipes can be taken apart again by unscrewing the caps.

Figure 1:
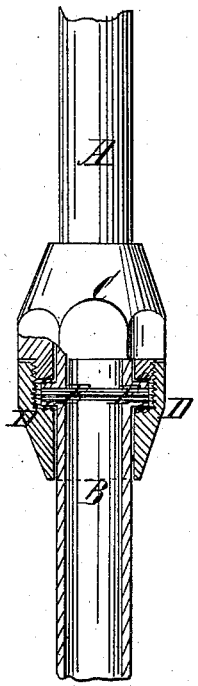
Figure 1 represents a side view, partly in section, of two ends of lead pipe connected by my improved method.
Figure 1:
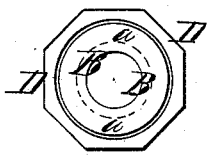

A B, in the drawing, represent the ends of two pieces of lead pipe. C D are two sleeves, fitted loosely around them. On the end of each pipe is formed a flange, $a$, by hammering the end down. One of the sleeves or caps C D is provided with male, the other with female-screw threads, as is clearly shown in fig. 1.

E is a washer, made of leather or other suitable material. The same is interposed between the ends of the pipes A B, and then the caps C D are screwed together, they bearing against the flanges $a$, and compressing the washer between the same, as is clearly indicated in fig. 1.

I am aware that screw-caps and bolts have been used to connect hard-metal pipes; but, though a mere change of material would not change the character of such device, a change modifying the mode of application, and involving a new process, would be sufficient therefor, even were no peculiarity presented in the apparatus used; and, therefore, having described my invention—

What I claim as new, and desire to secure by Letters Patent, is—

A lead-pipe connection, consisting of the screw-clamps C D, applied over flanges $a$ $a_x$ and packing, all substantially as and for the purpose set forth.

ISAAC DAVIS.

Witnesses:
WM. F. MCNAMARA,
ALEX. F. ROBERTS.